June 22, 1926.
E. R. HYDE
1,589,855
SECTIONAL GRINDING WHEEL
Filed March 10, 1925
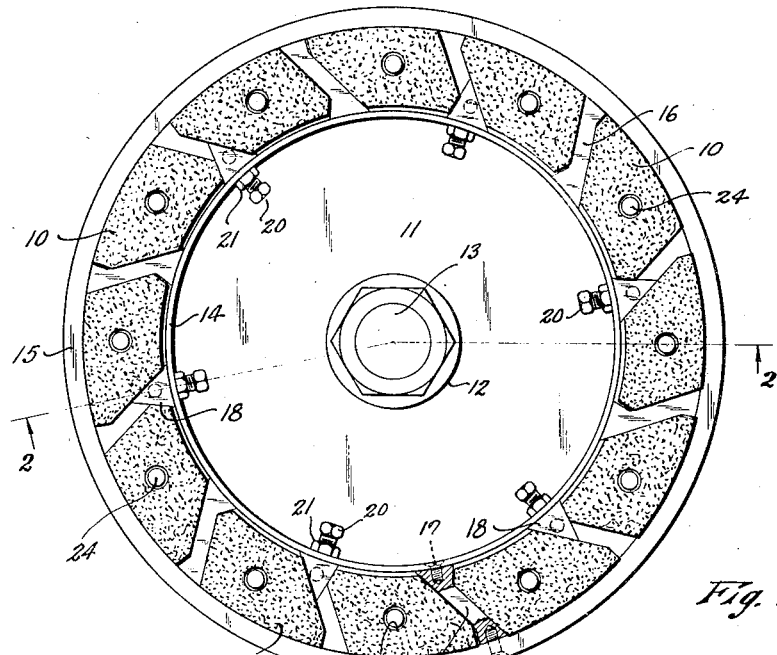
Fig. 1.
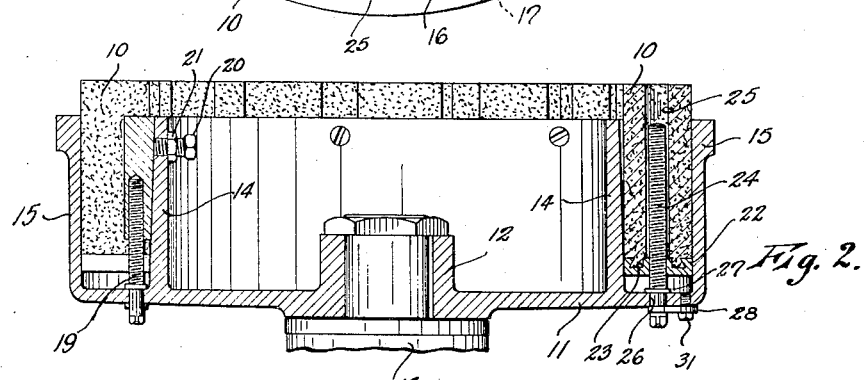
Fig. 2.
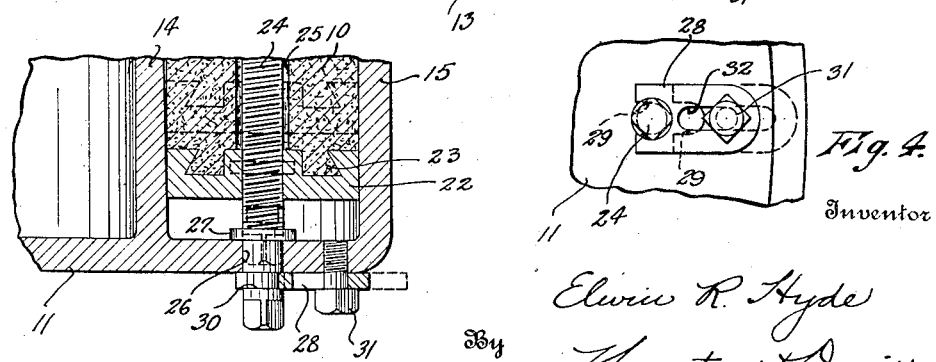
Fig. 3.
Fig. 4.
Inventor
Elwin R. Hyde
By Wooster & Davis
Attorneys.

Patented June 22, 1926.

1,589,855

UNITED STATES PATENT OFFICE.

ELWIN R. HYDE, OF BRIDGEPORT, CONNECTICUT, ASSIGNOR TO THE BRIDGEPORT SAFETY EMERY WHEEL COMPANY, INCORPORATED, OF BRIDGEPORT, CONNECTICUT.

SECTIONAL GRINDING WHEEL.

Application filed March 10, 1925. Serial No. 14,372.

This invention relates to sectional grinding wheels, particularly of the type disclosed in my prior Patent #1,133,475 issued March 30, 1915, and has for an object to provide an improved means for securing the adjusting screws in the holder to facilitate changing of the blocks or the mounting of new blocks, to thus reduce to a minimum the time required for renewing the blocks after they have worn out and the time in which the machine must remain idle.

With the foregoing and other objects in view, I have devised the construction illustrated in the accompanying drawing forming a part of this specification, similar reference characters being employed throughout the various figures to indicate corresponding elements. In this drawing, Fig. 1 is a front elevation of a grinding wheel constructed according to my invention.

Fig. 2 is a transverse section thereof substantially on line 2—2 of Fig. 1.

Fig. 3 is a detail section on an enlarged scale through a portion of a support, block and securing means for the adjusting screw, and Fig. 4 is a front elevation of the securing means.

My improved wheel comprises a support carrying a plurality of grinding blocks 10, the support comprising a carrying disc 11 having a hub 12 for attachment to a shaft 13, and this disc has on one face thereof a pair of spaced flanges 14 and 15 between which the grinding blocks 10 are mounted. The space between the two flanges is divided into a plurality of pockets by transversely extending division members 16 which are secured in any suitable manner, as by screws 17 extending through the flanges. The wheel is assembled with two grinding blocks 10 in each pocket, and they are preferably shaped in cross section substantially as shown in Fig. 1. The blocks are secured in position by means of tapered wedges 18 in the space between two adjacent blocks, these wedges being substantially triangular in cross section and bearing at one side against the inner flange 14 as shown. As indicated in Figs. 2 and 3 this inner flange is tapered to correspond with the taper of the wedges. The blocks are locked in position by rotating the screw 19 carried by the support and threaded into the wedge. It will be apparent that by drawing the wedge toward the disc it will force the blocks outwardly against the outer flange and also against the division members 16 between the pockets, and after the blocks are properly clamped in position the wedge is secured by the set screw 20, and this screw is locked by lock nut 21.

The grinding blocks 10 are provided with metal plates 22 secured thereto at their inner ends, as by a dove tail connection 23, and this block has a threaded opening for the adjusting screws 24. The blocks 10 are provided with openings 25 for this screw. The screw passes through an opening 26 in the disc 11 and has a flange 27 to engage with the inner wall of this disc to limit its movement in one direction. On the opposite side of the disc is a lock plate 28 which is forked at one end to provide an open sided recess 29, and the screw is provided with an annular groove 30 to receive the sides of this recess to prevent withdrawal of the screw from the opening. The lock plate is secured to the support by means of a screw 31 passing through an elongated slot 32 in the plate. It will be apparent that by loosening the screw 31 the plate may be shifted to withdraw the forked end from the groove 30 in the screw and thus release the screw so that it may be withdrawn from its opening in the support by removing the block 10 from the support.

In adjusting the blocks, the lock nut 21 and set screw 20 are loosened which will unlock the wedge 18. By then turning the screw 19 to push the wedges outwardly the blocks 10 are unlocked. By then manipulating the screws 24 the grinding blocks 10 may be adjusted in or out in their sockets as desired. This adjustment is generally used to project the blocks beyond the edges of the flanges as the blocks become worn and thus in effect renew the grinding surfaces until the available material of the blocks is consumed.

In renewing the blocks in the old construction it was necessary to thread the screws 24 for a considerable distance into the blocks, because, as will be obvious, the new blocks are as wide as the flanges, and as there were quite a large number of blocks in the wheel this operation required considerable time, so that not only was the machine out of operation during this time but also the services of the operator were required on other work than grinding operations. With my new construction, however, separate screws 24 can be threaded into the new blocks before they are mounted in the wheel, and this work may be done by unskilled labor. When it is required to renew the blocks in the wheel the old blocks with their screws can be removed, after being unlocked as above described, by merely loosening the securing screw 21 and moving the lock plate 28 to one side out of the groove 30. The entire block and screw may then be removed from the support and the new blocks with the new screws already threaded into position therein may be placed in the support, and the screws 24 secured by sliding the forked end of the plate 28 into the groove 30 and securing it in position by the screws 31. The blocks may then be locked by means of the wedges 18 as above described, and the wheel is ready for dressing to place it in condition for grinding. It will be obvious that this construction will greatly reduce the time required to renew the blocks and place the machine again in condition for operation.

Having thus described the nature of my invention, what I claim is:

A grinding wheel comprising a support having spaced flanges and perforations between said flanges, a plurality of separate grinding blocks mountable between the flanges, means for adjusting the positions of the blocks comprising a screw having threaded engagement with the blocks and having heads by which they may be rotated, said heads being adapted to be freely inserted through said perforations so as to be rotatable therein, a locking device on the support arranged to prevent longitudinal movement of the screw when so rotated to permit of adjustment of the block thereby, said device being movable to an ineffective position to allow such insertion and removal of the screw whereby the screw can be inserted into the block before assembly of the block in the support.

In testimony whereof I affix my signature.

ELWIN R. HYDE.